(12) United States Patent
Ishida

(10) Patent No.: US 7,401,256 B2
(45) Date of Patent: Jul. 15, 2008

(54) SYSTEM AND METHOD FOR HIGHLY AVAILABLE DATA PROCESSING IN CLUSTER SYSTEM

(75) Inventor: Takaichi Ishida, Yokohama (JP)

(73) Assignee: Hitachi, Ltd., Toyko (JP)

( * ) Notice: Subject to any disclaimer, the term of this patent is extended or adjusted under 35 U.S.C. 154(b) by 617 days.

(21) Appl. No.: 10/998,610

(22) Filed: Nov. 30, 2004

(65) Prior Publication Data

US 2005/0262381 A1 Nov. 24, 2005

(30) Foreign Application Priority Data

Apr. 27, 2004 (JP) ............................. 2004-131071

(51) Int. Cl.
G06F 11/00 (2006.01)
(52) U.S. Cl. ........................................... 714/21; 714/8
(58) Field of Classification Search .................... 714/8, 714/21, 24, 55, 56, 57
See application file for complete search history.

(56) References Cited

U.S. PATENT DOCUMENTS 5,852,724 A 12/1998 Glenn, II et al.
6,728,905 B1* 4/2004 Gnanasivam et al. ........... 714/43
6,978,398 B2* 12/2005 Harper et al. .................. 714/13
7,246,261 B2* 7/2007 Miller et al. .................... 714/7
2003/0079154 A1* 4/2003 Park et al. ....................... 714/1
2004/0015968 A1* 1/2004 Neiman et al. ............... 718/100

* cited by examiner

Primary Examiner—Joshua A Lohn
(74) Attorney, Agent, or Firm—Mattingly, Stanger, Malur & Brundidge, PC

(57) ABSTRACT

Even if business processing is transaction, a standby-type cluster system copes with double faults in a short time while holding down the standby computer cost to the minimum. An execution server monitoring thread in a standby server periodically monitors an operation state of an execution server. Upon detecting time-out as a result of the monitoring, the thread resets the execution server, stops load balancing to an IP address of the execution server, recovers transaction of the execution server, and returns to monitoring of the operation state. If normality of the execution server is detected as the result of monitoring and an operation state in an execution server management table is "stop," the thread starts the load balancing to the execution server and returns to the monitoring of the operation state.

4 Claims, 4 Drawing Sheets

FIG. 5

EXECUTION SERVER MANAGEMENT TABLE {#500}

| EXECUTION SERVER IDENTIFIER | IP ADDRESS | SHARED DISK UNIT INFORMATION | OPERATION STATE | RECOVERY SEQUENCE POINTER |
|---|---|---|---|---|
| EXECUTION SERVER 1 | AAAA | /dev/A | IN OPERATION | NULL |
| EXECUTION SERVER 2 | BBBB | /dev/B | UNDER RECOVERY | SERVER M |
| EXECUTION SERVER 3 | CCCC | /dev/C | STOP | NULL |
| -------- | -------- | -------- | -------- | -------- |
| EXECUTION SERVER M | MMMM | /dev/M | ON STANDBY | NULL |
| -------- | -------- | -------- | -------- | -------- |
| EXECUTION SERVER N | NNNN | /dev/N | IN OPERATION | NULL |

501  502  503  504  505

SYSTEM AND METHOD FOR HIGHLY AVAILABLE DATA PROCESSING IN CLUSTER SYSTEM

INCORPORATION BY REFERENCE

The present application claims priority from Japanese application JP2004-131071 filed on Apr. 27, 2004, the content of which is hereby incorporated by reference into this application.

BACKGROUND OF THE INVENTION

The present invention relates to a cluster control method and a cluster control program in a cluster system for implementing high availability of a computer system.

As a technique for implementing high availability of a computer system, there is a cluster system in which a plurality of independently operating computers are collectively handled as one computer. The cluster systems are broadly classified into scalable-type cluster systems and standby-type cluster systems. In the scalable-type cluster systems, normally operation is conducted by using all computers, and when a fault has occurred, down-scaling is conducted and the operation is continued. In the standby-type cluster systems, a standby computer which is activated when a fault has occurred is provided. The standby-type cluster systems are further classified into 1:1 standby type, 1:1 mutual standby type, N:1 standby type and N:M standby type cluster systems. Each of the N:1 standby type cluster systems includes N active computers and one standby computer. In the N:1 standby type cluster systems, high availability of the computer system and expandability of business processing (scalability) can be implemented while suppressing the cost of the standby computer. Each of the N:M standby type cluster systems includes N active computers and M standby computers (where typically N>M) The N:M standby type cluster system inherits the merits of the N:1 standby type cluster systems, and in addition the N:M standby type cluster system can cope with M fault occurrences. An example of the N:1 standby type cluster system is disclosed in U.S. Pat. No. 5,852,724.

SUMMARY OF THE INVENTION

In the case where the business processing is transaction, however, it is difficult for the conventional N:1 standby type cluster system to cope with double faults in the computer system in a short time. In other words, when a fault has occurred in one active computer, the one standby computer recovers the interrupted transaction (business processing) and takes over it. Unless the active computer in which the fault has occurred becomes ready to normally operate, therefore, the standby computer cannot cope with a fault that subsequently occurs in another active computer. Here, "transaction" refers to unit of processing that cannot be divided although business processing is formed of a plurality of processes. On the other hand, the conventional N:M standby type cluster system can cope with M fault occurrences. As compared with the N:1 standby type cluster system, complicatedness of operation and the cost of the standby computer pose a problem in the N:M standby type cluster system.

In other words, the standby-type cluster systems have a problem that it is difficult to cope with double faults in the computer system in a short time while holding down the cost of the standby computer to a minimum when business processing is transaction.

In view of the problems, therefore, an object of the present invention is to provide means capable of coping with double faults in a standby cluster system in a short time while holding down the cost of the standby computers to the minimum even if business processing is transaction.

In order to achieve the object, in a standby-type cluster system formed by network-connecting a load balancer connected to a client to distribute processing requests received from the client, execution servers for receiving processing requests distributed by the load balancer and executing the processing, and a standby server responsive to detection of a fault in an execution server to recover transaction in the execution server, the present invention provides a cluster control method and its program in which the standby server monitors operation states respectively of the execution servers, recovers transaction in an execution server in which a fault has occurred, and conducts down-scaling control on the execution server.

In this method, as processing conducted every execution server, the standby server monitors an operation state of the execution server at predetermined time intervals, recovers transaction in the execution server in which a fault has occurred, and then continues operation state monitoring of the execution server without taking over processing of the execution server. As a result, the standby server recovers the transaction in the execution server in which a fault has occurred, on occasion. Since the recovery is thus prevented from stagnating, it becomes possible to prevent in-doubt transaction of the execution server from interrupting business processing in another execution server.

Furthermore, in this method, when down-scaling the execution server in which a fault has occurred, the standby server transmits a message to order the load balancer to remove the execution server from the configuration list of execution servers. As a result, it becomes possible to prevent the execution server in which a fault has occurred and the standby server which is taking over its IP address and recovering transaction (which is failing over) from being improperly given a processing request. When de-downscaling or releasing the down-scaling of the execution server that is recovered from the fault and that is ready to operate, the standby server transmits a message to order the load balancer to add the execution server to the configuration list of execution servers. As a result, the execution server that has become ready to operate is supplied with a processing request from the load balancer, and load balancing is conducted.

Furthermore, in this method, the standby server includes, every execution server, a recovery sequence pointer for setting therein null or a pointer to an execution server for which transaction should be recovered subsequently, in order to control transaction recovery sequence when a fault has occurred. The standby server adds a pointer to the execution server in which a fault has occurred, in accordance with recovery sequence pointers, and conducts transaction recovery in order. As a result, transactions in execution servers can be recovered in accordance with an order in which faults in execution servers occurred.

In "when conducting processing on a predetermined execution server" in claims, "processing" and "processing on an execution server" correspond to "an execution server monitoring thread in the standby server" in a preferred embodiment of the present invention described later. The state of "down-scaling of execution server" and "recovery sequence pointer" in claims are managed by an "execution server management table" in the preferred embodiment of the present invention described later.

According to the present invention, double faults in a computer system can be coped with in a short time even if the business is transaction. After the standby server has recovered transaction, the standby server is on standby again without taking over business processing. As a result, the cost of the standby system can be held down to the minimum. Transactions are recovered in accordance with the order in which faults have occurred. As a result, consistency in transaction recovery can be ensured when double faults have occurred.

Other objects, features and advantages of the invention will become apparent from the following description of the embodiments of the invention taken in conjunction with the accompanying drawings.

BRIEF DESCRIPTION OF THE DRAWING

FIG. 5 is a diagram showing a configuration of an execution server management table according to an embodiment of the present invention.

DESCRIPTION OF THE EMBODIMENTS

Figure 1:
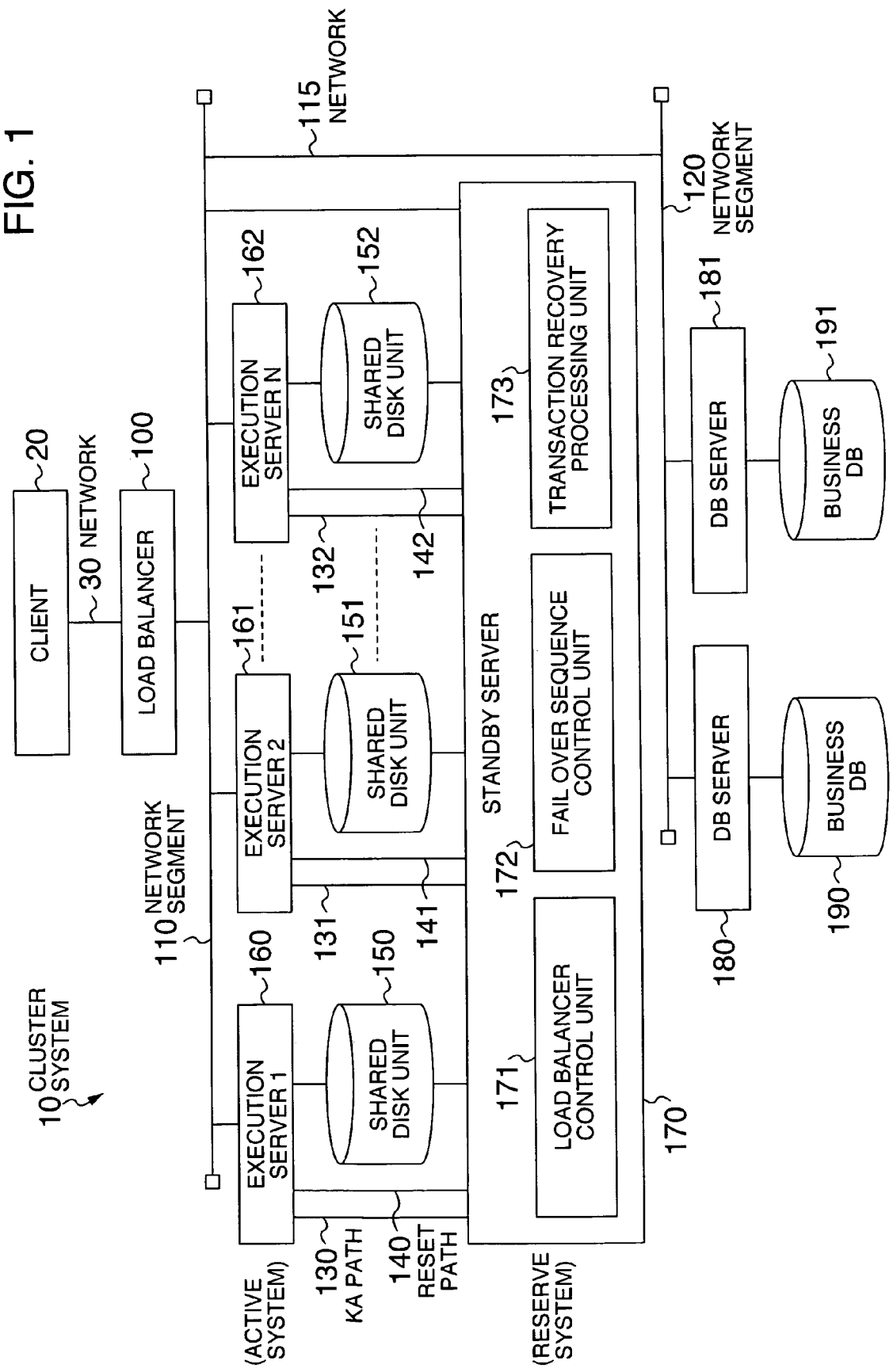
FIG. 1 is a diagram showing a configuration of a standby-type cluster system according to an embodiment of the present invention.

Hereafter, a preferred embodiment of the present invention (hereafter referred to as the embodiment of the present invention) will be described in detail with reference to the drawing.

<<Configuration and Outline of Cluster System>>

A configuration of a standby-type cluster system according to the embodiment of the present invention will now be described with reference to FIG. 1. In the standby-type cluster system (referred to simply as "cluster system 10" in FIG. 1 and ensuing description), the same business processing program is deployed in a plurality of execution servers in order to cause the execution servers to conduct distributed processing in response to business processing requests received from a client 20 by a load balancer 100. The cluster system 10 includes the one load balancer 100 connected to a network segment 110, N execution servers 160 to 161, one standby server 170, and two DB servers 180 and 181 connected to a network segment 120. The network segment 110 is connected to the network segment 120 via a network 115. The execution servers 160 to 162 are connected to the standby server 170 via KA (Keep Alive) paths 130 to 132, reset paths 140 to 142, and shared disk units 150 to 152, respectively. The DB servers 180 and 181 have business DBs 190 and 191 referred to and updated by the execution servers 160 to 162 during business processing, as subordinates, respectively.

The load balancer 100 receives business processing requests from the client 20 connected via a network 30. The load balancer 100 distributes the business processing requests among execution servers that are effective now in a configuration list (not illustrated) of execution servers retained by itself. For the distribution, for example, the round robin scheduling policy is used. The configuration list is updated by an order issued from a load balancer control unit 171 in the standby server 170. The execution servers 160 to 162 are servers that execute business processing corresponding to business processing requests distributed by the load balancer 100, and they are the so-called active servers. When executing business processing, the execution servers 160 to 162 refer to and update the business DB 190 via the DB server 180, and refer to and update the business DB 191 via the DB server 181. When business processing is transaction, the execution servers 160 to 162 update both the business DBs 190 and 191. By the way, the reason why the execution servers are provided with numerals as in "execution server 1," "execution server 2," and "execution server N" is for the sake of associating them with execution server identifiers 501 shown in FIG. 5. The standby server 170 is a server that conducts transaction recovery processing when an execution server has stopped, and it is the so-called reserve system (standby system). The standby server 170 includes the load balancer control unit 171, a fail over sequence control unit 172 and a transaction recovery processing unit 173. The load balancer control unit 171 has a function of controlling the load balancer 100. Specifically, the load balancer control unit 171 orders the load balancer 100 to add or delete an execution server to or from the configuration list on the basis of the operation states of the execution servers. The fail over sequence control unit 172 has a function of controlling the transaction recovery sequence when double faults have occurred. The transaction recovery processing unit 173 has a function of recovering the in-doubt transaction of an execution server when the execution server has stopped.

The KA paths 130 to 132 are signal lines used to monitor the operation states of the execution servers by the standby server 170. The reset paths 140 to 142 are signal lines used to conduct reset processing such as network adaptor stopping and CPU (Central Processing Unit) resetting by the standby server 170. The shared disk units 150 to 152 successively store transaction states in respective execution servers. Respective execution servers and the standby server 170 can refer to and update the stored transaction states.

In the embodiment of the present invention, it is supposed that business processing programs deployed in the execution servers 160 to 162 execute global transaction on the DB servers 180 and 181, and store the transaction states in the shared disk units 150 to 152, respectively. However, the business processing programs deployed in the execution servers 160 to 162 may execute local transaction on a single DB. The shared disk units 150 to 152 may be implemented by using the same shared disk unit. In the embodiment of the present invention, redundant configurations for the load balancer, network, network adaptor and the DB server are not adopted for convenience of description. However, redundant configurations of them may be adopted.

Implementation forms of the components will now be described. The client 20 is implemented by using a client computer such as a PC (Personal Computer). The load balancer 100 is implemented by using a PC having load balancing software installed therein or dedicated hardware. The execution servers 160 to 162, the standby server 170, and the DB servers 180 and 181 are implemented by using the so-called server computers. The shared disk units 150 to 152 and the business DBs 190 and 191 are implemented by using storage units such as hard disk units. The load balancer control unit 171, the fail over sequence control unit 172 and the transaction recovery processing unit 173 are implemented by execution of a program stored in a predetermined memory conducted by a CPU incorporated in the standby server 170.

<<Processing in Cluster System>>

Figure 2:
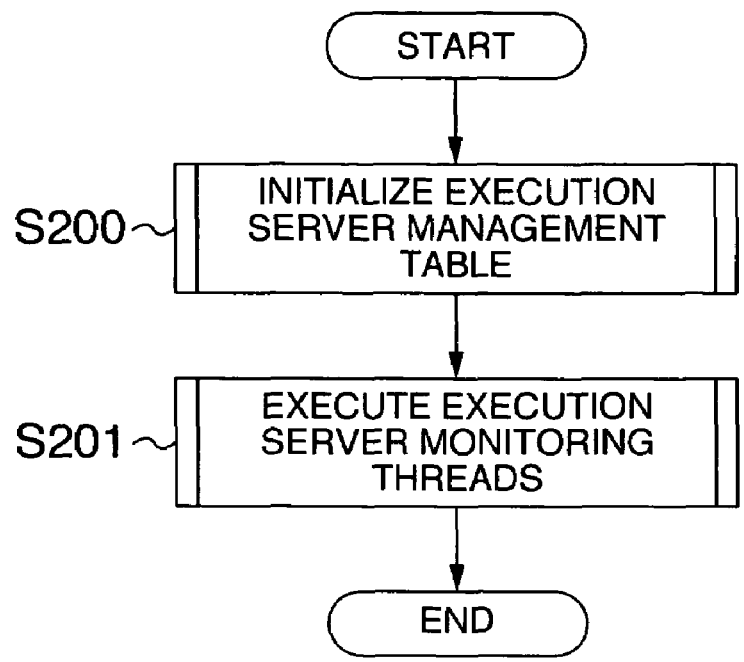
FIG. 2 is a flow chart showing a processing flow in a standby server according to an embodiment of the present invention.

A flow of processing in the standby server according to the embodiment of the present invention will now be described with reference to FIG. 2 (see FIG. 1 suitably). The standby server first initializes an execution server management table 500 shown in FIG. 5 (step S200). Here, the execution server management table 500 is a table preserved in the standby server 170 to manage the states of the execution servers. Details of the execution server management table 500 will be described later (see FIG. 5). Subsequently, the standby server executes N execution server monitoring threads respectively associated with the execution servers to be monitored by the standby server 170 (step S201). In the embodiment of the present invention, a plurality of threads (division unit of process) respectively associated with the execution servers are used in the standby server 170 to monitor the execution servers. However, a plurality of processes (tasks) associated with the execution servers may also be used.

Figure 3:
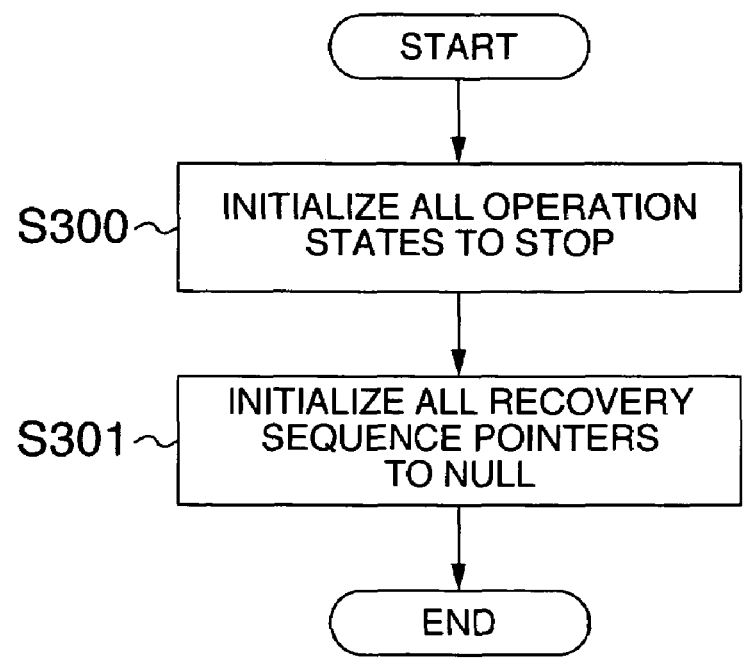
FIG. 3 is a flow chart showing a flow of initialization processing of an execution server management table according to an embodiment of the present invention.

A flow of initialization processing of the execution server management table according to the embodiment of the present invention will now be described with reference to FIG. 3. The initialization processing corresponds to processing in step S200 shown in FIG. 2. The standby server 170 first initializes all operation states 504 (see FIG. 5) in the execution server management table 500 to "stop" (step S300). Subsequently, the standby server 170 initializes all recovery sequence pointers 505 (see FIG. 5) in the execution server management table 500 to null (step S301). By the way, the initialization processing of these kinds may be conducted by an execution server monitoring thread which will be described later.

Figure 4:
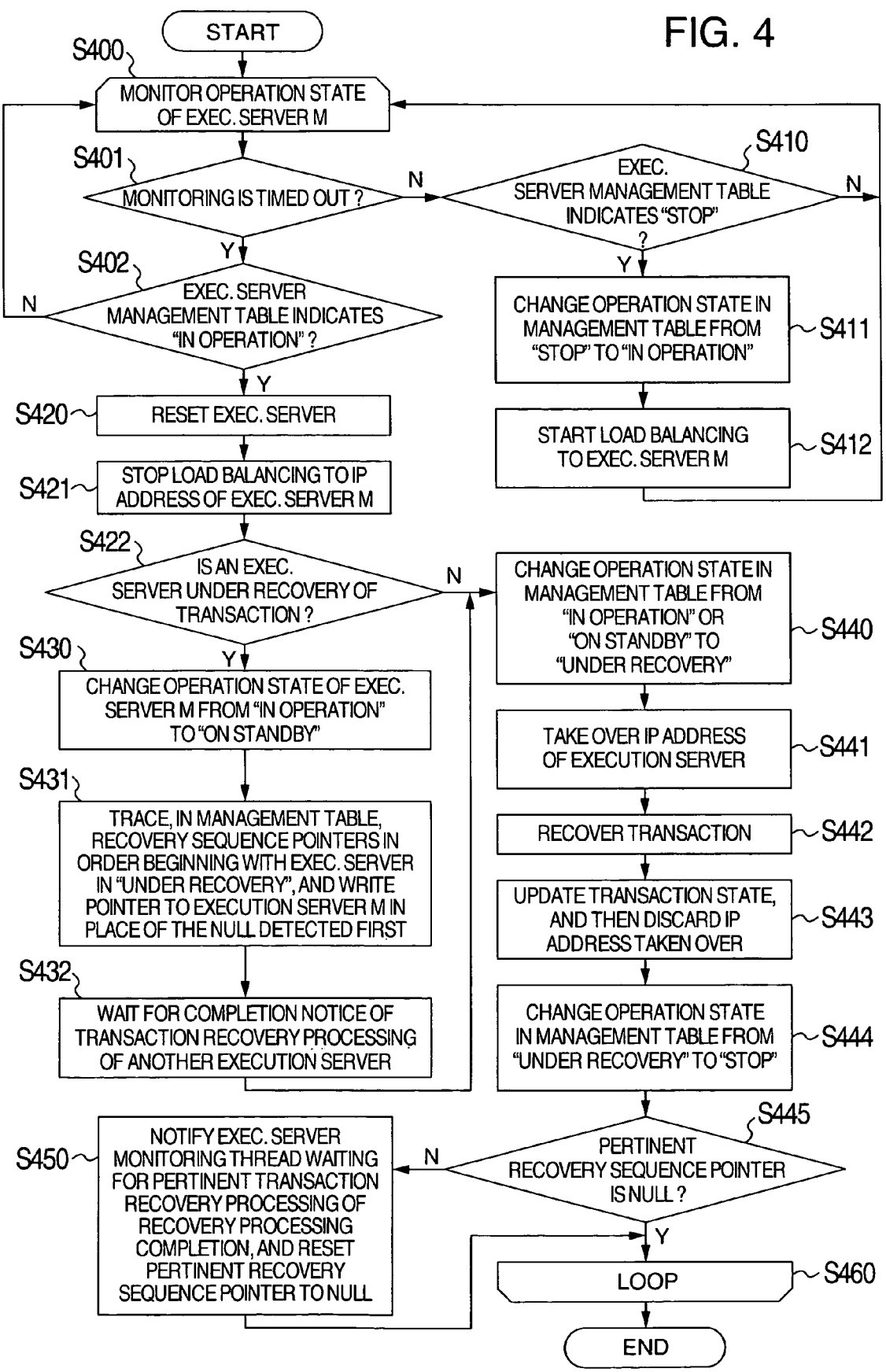
FIG. 4 is a flow chart showing a processing flow in an execution server monitoring thread according to an embodiment of the present invention.

A flow of processing in the execution server monitoring thread according to the embodiment of the present invention will now be described with reference to FIG. 4 (see FIG. 1 suitably). The processing corresponds to the processing at the step S201 shown in FIG. 2. An execution server monitoring thread M corresponding to an execution server M (M=1 to N) first monitors the operation state of the execution server M periodically (at predetermined time intervals) by using a KA path connected to the execution server M (step S400). The execution server monitoring thread M judges the operation state of the execution server M to be monitored on the basis of whether the monitoring of the operation state has timed out (step S401). Here, "the monitoring of the operation state has timed out" means that the execution server monitoring thread M has transmitted a response request to the execution server M via a KA path whereas there is no response from the execution server M even if a predetermined time-out time elapses. In other words, it is meant that the execution server M is in the stop state due to a fault. If the operation state can be acquired within the predetermined time-out time (there is a response to a response request) (N at the step S401), then the execution server monitoring thread M checks the operation state 504 of the execution server M in the execution server management table 500 shown in FIG. 5 (step S410). If the operation state 504 of the execution server M is "stop," then the operation state 504 is changed from "stop" to "in operation" (step S411). In response to an order issued by the execution server monitoring thread M, the load balancer control unit 171 starts load balancing on the execution server M (step S412). Specifically, first, the load balancer control unit 171 transmits a message to the load balancer 100 to order that the execution server M should be added to the configuration list. Upon receiving the order message, the load balancer 100 adds the execution server M to the configuration list. As a result, the load balancer 100 distributes business processing to the execution server M as well. In this way, load balancing to the execution server M is started. Thereafter, the execution server monitoring thread M monitors the operation state of the execution server M again (step S400). If the operation state 504 of the execution server M is not "stop," i.e., the operation state 504 of the execution server M is "in operation" (N at the step S410), then the execution server monitoring thread M monitors the operation state of the execution server M again (step S400).

If the operation state cannot be acquired within the timeout time (Y at the step S401), then the execution server monitoring thread M checks whether the operation state 504 of the execution server M in the execution server management table 500 is "in operation" (step S402). If the operation state 504 is not "in operation", i.e., the operation state 504 is "stop" (N at the step S402), then the execution server monitoring thread M monitors the operation state of the execution server M (step S400). If the operation state 504 is "in operation" (Y at the step S402), then the execution server monitoring thread M conducts reset processing, such as the network adaptor stop and the CPU reset, of the execution server M by using the reset path connected to the execution server M (step S420). Subsequently, in response to an order issued by the execution server monitoring thread M, the load balancer control unit 171 stops load balancing to an IP address of the execution server M (step S421). Specifically, first, the load balancer control unit 171 transmits a message to the load balancer 100 to order that an IP address of the execution server M should be deleted from the configuration list. Subsequently, the load balancer 100 receives the order message, and deletes the IP address of the execution server M from the configuration list. As a result, the load balancer does not distribute business processing to the IP address of the execution server M. Thus, the load balancing to the IP address of the execution server M is stopped. This aims at preventing the standby server 170 from taking over the IP address of the execution server M when recovering transaction separately and thereby preventing business processing corresponding to a new business processing request issued by the client 20 from being distributed from the load balancer 100 to the standby server 170.

Subsequently, the execution server monitoring thread M searches the operation state 504 in the execution server management table 500, and determines whether there is an execution server in an "under recovery" state of transaction (step S422). If there is an execution server in the "under recovery" state (Y at the step S422), then the operation state 504 of the execution server M is changed from "in operation" to "on standby" (step S430). Subsequently, the recovery sequence pointers 505 of execution servers in the "under recovery" state are traced one after another, and a pointer to the execution server M is written into a place where null is first detected (step S431). And the execution server monitoring thread M is on standby until a completion notice of transaction recovery processing arrives from another execution server monitoring thread (step S432).

If an execution server in the "under recovery" state is not present (N at the step S422), or if the completion notice of the transaction recovery processing is received (if waiting at the step S432 is canceled), then the execution server monitoring thread M changes the operation state 504 of the execution server M in the execution server management table 500 is changed from "in operation" or "on standby" to "under recovery" (step S440). And the execution server monitoring thread M takes over the IP address of the execution server M (step S441). Specifically, a stationary IP address is previously set in a LAN adapter (not illustrated) in the standby server 170, and the IP address of the execution server M is set as an alias of the stationary IP address. As a result, the standby server 170 can execute business processing requested by another execution server in order to recover in-doubt transaction, in the place of the execution server M.

Subsequently, the execution server monitoring thread M acquires the state of transaction stored in the shared disk unit from shared disk unit information 503 of the execution server M in the execution server management table 500, and orders the transaction recovery processing unit 173 to recover in-doubt transaction of the execution server M (step S442). Specifically, the transaction recovery processing unit 173 recovers transaction from the load balancer 100 and transaction from another execution server according to the state of the transaction in the execution server M.

When recovering transaction from the load balancer 100, the transaction recovery processing unit 173 completes transaction by conducting commission and restores the state before transaction by conducting rollback. For example, it is supposed that the transaction conducts process A in which update of the business DB 190 is generated and the transaction subsequently conducts a process B in which update of the business DB 191 is generated. In that case, when the transaction state is normal end of the process A and the process B, commission for updating the business DBs 190 and 191 is conducted in order to complete the transaction. When the transaction state is abnormal end of the process A and the process B, the transaction recovery processing unit 173 stops update of the business DBs 190 and 191 and conducts rollback in order to restore the state before the transaction.

On the other hand, the execution server M receives transaction not from the load balancer 100, but from a different execution server in some cases. For example, a different execution server branches global transaction received from the load balancer 100, to the execution server M in some cases. If the execution server M abnormally stops while it is executing the branched transaction, then the business processing is interrupted. When recovering the transaction branched from the different execution server, the transaction recovery processing unit 173 in the standby server 170 first orders the different execution server relating to the branched in-doubt transaction to recover the transaction. In response to this, the different execution server determines how the branched transaction should be settled, and orders the standby server 170 to settle the branched transaction. The transaction recovery processing unit 173 in the standby server 170 settles the transaction in accordance with the order given by the different execution server. By the way, at this time, the different execution server exchanges information with the standby server 170 by using the IP address of the execution server M taken over at the step S441.

Owing to the processing heretofore processing, it becomes possible to prevent business processing in the different execution server from being interrupted because of the in-doubt transaction in the execution server M. Especially in the case of global transaction, a comparatively long transaction time-out value is set, and consequently the improvement effect of the availability obtained by conducting the recovery processing of in-doubt transaction is great.

The execution server monitoring thread M updates the state of the transaction stored in the shared disk unit, and discards the IP address of the execution server M taken over (step S443). Specifically, the execution server monitoring thread M removes the IP address of the execution server M set as the alias at the step S441 from the setting in the LAN adapter in the standby server 170. Subsequently, the execution server monitoring thread M changes the operation state 504 of the execution server M in the execution server management table 500 from "under recovery" to "stop" (step S444). And the execution server monitoring thread M checks whether the recovery sequence pointer 505 of the execution server M in the execution server management table 500 is null (step S445). If it is null (Y at the step S445), then the execution server monitoring thread M monitors the operation state of the execution server M again (steps S460 and S400). If it is not null, then the execution server monitoring thread M notifies an execution server monitoring thread corresponding to an execution server indicated by the recovery sequence pointer 505 that the transaction recovery processing has completed, and resets the recovery sequence pointer 505 to null (step S450). In response to the completion notice of the transaction recovery processing, the notice waiting state in the notified execution server monitoring thread at the step S432 is canceled. The execution server monitoring thread M monitors the operation state of the execution server M again (steps S460 and S400).

In the embodiment of the present invention, the same business processing program is deployed in a plurality of execution servers. Even when multiple faults occur in the execution servers 160 to 162, therefore, it is possible to downscale the cluster system 10 and continue the business processing owing to the steps S442 to S444.

A configuration of the execution server management table used by the execution server monitoring thread according to the embodiment of the present invention will now be described with reference to FIG. 5. The execution server management table 500 is a table including records. Each record includes an execution server identifier 501 for uniquely identifying an execution server, an IP address 502 provided for a LAN adapter in the execution server, shared disk unit information 503 which is information concerning a shared disk unit that stores the transaction state, an operation state 504 of the execution server, and a transaction recovery sequence pointer 505.

In the operation state 504, there are "stop," "in operation," "under recovery," and "on standby." The "stop" indicates that the execution server is not ready to conduct business processing after power is turned on or after transaction recovery responsive to fault occurrence. The "in operation" indicates that the execution server is ready to conduct business processing. The "under recovery" indicates a state in which the standby server 170 is detecting a fault in the execution server and recovering transaction. The "on standby" indicates a state in which the transaction recovery of an execution server is on standby because the standby server 170 is recovering transaction of another execution server when multiple faults have occurred in execution servers.

In the recovery sequence pointer 505, a pointer to an execution server that should recover transaction the next time is stored, in order to form a list which indicates a sequence of transaction recovery when multiple faults have occurred in execution servers. The top of the list is an execution server having "under recovery" in the operation state 504. The end of the list is an execution server that first becomes null in the recovery sequence pointer 505 when the list is traced.

Heretofore, the embodiment of the present invention has been described. The cluster system according to the embodiment of the present invention is implemented by recording programs executed in the load balancer and servers shown in FIG. 1 on a recording medium that can be read by a computer, making a computer system read the programs recorded on the recording medium, and executing the programs. Herein, the computer system includes software such as an OS (Operating System) and hardware such as peripheral devices.

Heretofore, a preferred embodiment of the present has been described. However, the present invention is not limited to the embodiment, but changes can be made suitably without departing from the spirit of the invention. For example, the following embodiments are conceivable.

(1) In the embodiment, the standby server 170 uses signal lines such as a KA path and a reset path in order to monitor and reset the execution servers. Alternatively, those functions may be implemented by using a network. According to this, it becomes unnecessary to connect signal lines between the standby server 170 and each execution server. As a result, the construction cost of the cluster system can be reduced. (2) In the embodiment, one standby server 170 is used. Alternatively, the 1:1 standby configuration may be applied to the standby server. Within a cost range that poses no problem as the standby system as compared with the cost of the execution servers in the active system and the DB servers, a plurality of standby servers may be disposed. According to this, the availability of the standby server can be improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. In a standby-type cluster system formed by network-connecting:
    a load balancer connected to a client to distribute processing requests received from the client;
    execution servers for receiving processing requests distributed by the load balancer and executing the processing; and
    a standby server responsive to detection of a fault in an execution server to recover transaction in the execution server,
    a cluster control method in which the standby server monitors operation states respectively of the execution servers, recovers transaction in an execution server in which a fault has occurred, and conducts down-scaling control on the execution server, and
    when conducting processing on a predetermined execution server, the standby server executes the steps of:
    monitoring an operation state of the execution server at predetermined time intervals;
    responding to detection of a fault in the execution server as a result of the monitoring, by resetting and down-scaling the execution server;
    subsequently recovering transaction in the execution server and returning to the operation state monitoring; and
    responding to detection of normality of the execution server as a result of the monitoring and down-scaling of the execution server, by releasing the down-scaling of the execution server and returning to the operation state monitoring, wherein
    the load balancer comprises a configuration list of execution servers to distribute the processing requests, and
    in conducting processing on a predetermined execution server,
    when down-scaling the execution server, the standby server transmits a message to order the load balancer to remove the execution server from the configuration list, and
    when releasing the down-scaling of the execution server, the standby server transmits a message to order the load balancer to add the execution server to the configuration list, and wherein
    the standby server comprises, for every execution server, a recovery sequence pointer for setting therein null or a pointer to an execution server for which transaction should be recovered subsequently, in order to control transaction recovery sequence when a fault has occurred, and
    when conducting processing on a predetermined execution server, the standby server further executes the steps of:
    setting the recovery sequence pointer of the execution server to null as initialization processing;
    responding to presence of an execution server already under transaction recovery before recovering the transaction, by setting a pointer to the pertinent execution server on a recovery sequence pointer that first becomes null when the recovery sequence pointers are traced from the execution server under recovery;
    subsequently waiting for a completion notice of transaction recovery processing issued from processing conducted on another execution server, and starting recovery of the transaction; and
    responding to the recovery sequence pointer of the pertinent execution server which is not null after the recovery of the transaction, by giving a notice of recovery processing completion to processing conducted on an execution server indicated by the recovery sequence pointer and setting null to the recovery sequence pointer.

2. A cluster control program, on a recording medium, used to make server computers execute the cluster control method according to claim 1.

3. In a standby-type cluster system formed by network-connecting:
    a load balancer connected to a client to distribute processing requests received from the client;
    execution servers for receiving processing requests distributed by the load balancer and executing the processing; and
    a standby server responsive to detection of a fault in an execution server to recover transaction in the execution server,
    a cluster control method in which the standby server monitors operation states respectively of the execution servers, recovers transaction in an execution server in which a fault has occurred, and conducts down-scaling control on the execution server, and
    when conducting processing on a predetermined execution server, the standby server executes the steps of:
    monitoring an operation state of the execution server at predetermined time intervals;
    responding to detection of a fault in the execution server as a result of the monitoring, by resetting and down-scaling the execution server;
    subsequently recovering transaction in the execution server and returning to the operation state monitoring; and
    responding to detection of normality of the execution server as a result of the monitoring and down-scaling of the execution server, by releasing the down-scaling of the execution server and returning to the operation state monitoring, wherein
    the standby server comprises, for every execution server, a recovery sequence pointer for setting therein null or a pointer to an execution server for which transaction should be recovered subsequently, in order to control transaction recovery sequence when a fault has occurred, and
    when conducting processing on a predetermined execution server, the standby server further executes the steps of:

setting the recovery sequence pointer of the execution server to null as initialization processing;

responding to presence of an execution server already under transaction recovery before recovering the transaction, by setting a pointer to the pertinent execution server on a recovery sequence pointer that first becomes null when the recovery sequence pointers are traced from the execution server under recovery;

subsequently waiting for a completion notice of transaction recovery processing issued from processing conducted on another execution server, and starting recovery of the transaction; and responding to the recovery sequence pointer of the pertinent execution server which is not null after the recovery of the transaction, by giving a notice of recovery processing completion to processing conducted on an execution server indicated by the recovery sequence pointer and setting null to the recovery sequence pointer.

4. A cluster control program, on a recording medium, used to make server computers execute the cluster control method according to claim 3.

* * * * *